July 19, 1960  W. E. STEVENS  2,945,663
BUMPER JACK SUPPORT
Filed Oct. 14, 1957  2 Sheets-Sheet 1
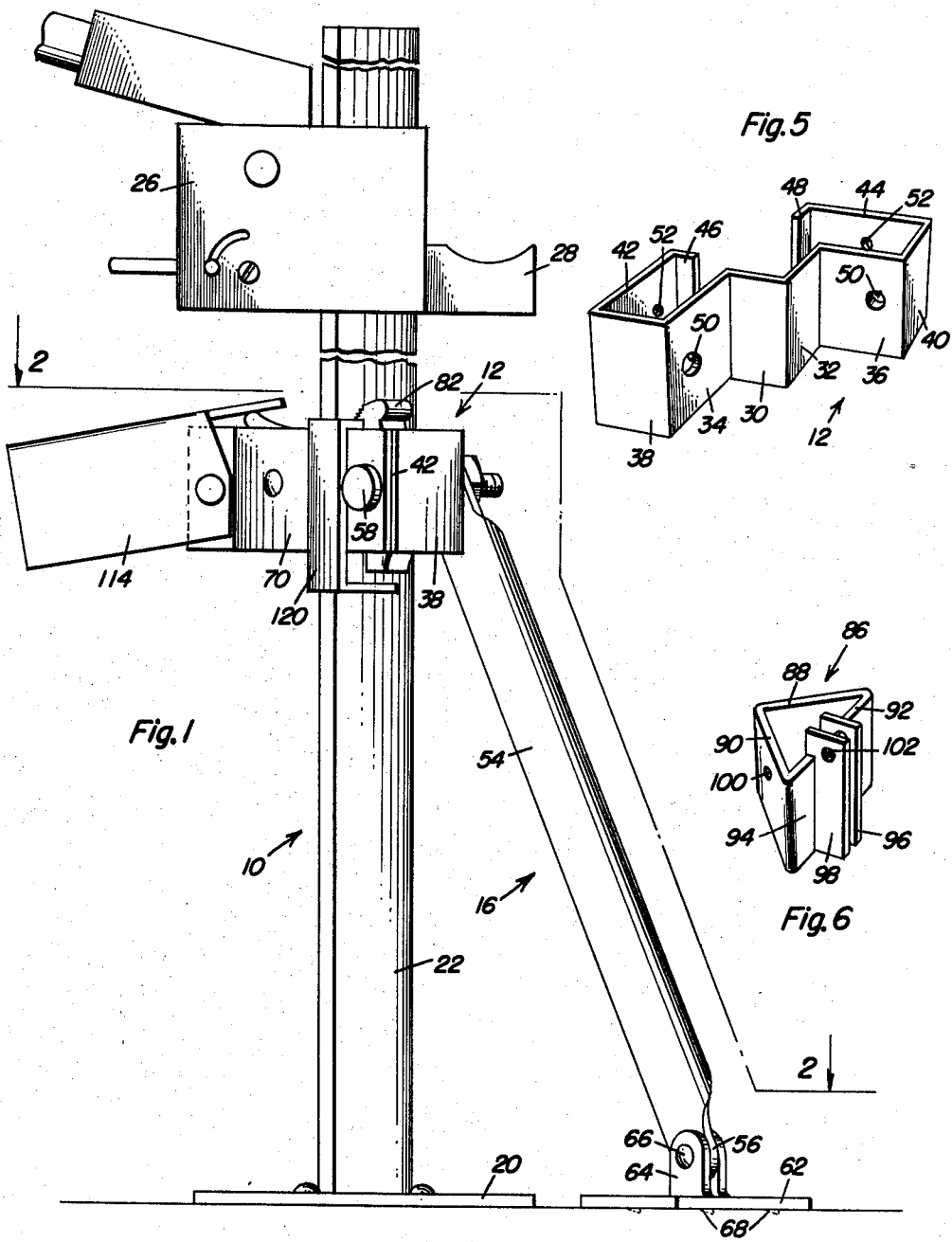
William E. Stevens INVENTOR.

July 19, 1960  W. E. STEVENS  2,945,663
BUMPER JACK SUPPORT
Filed Oct. 14, 1957  2 Sheets-Sheet 2
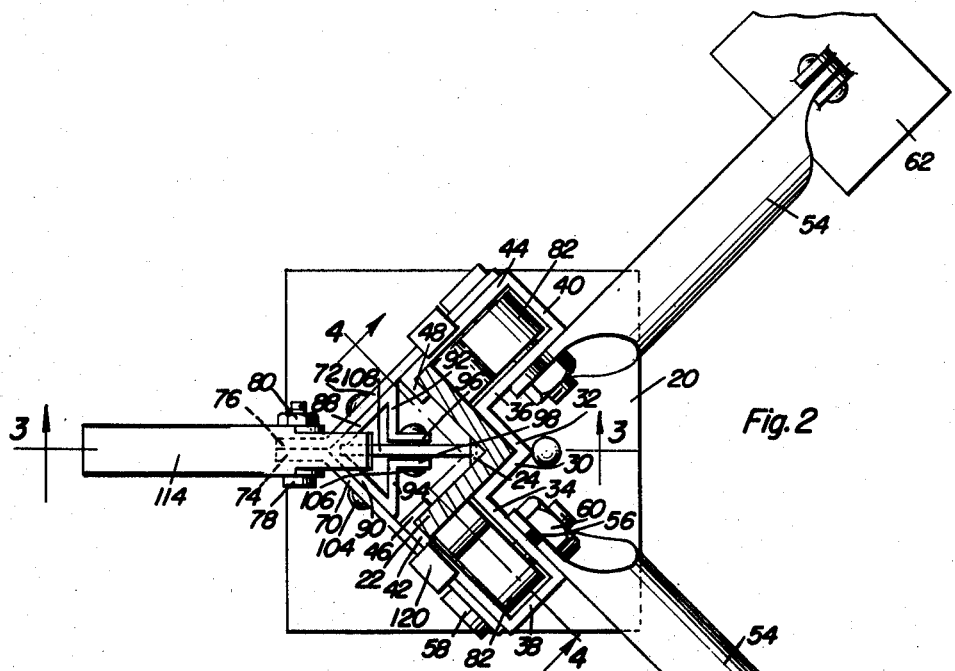
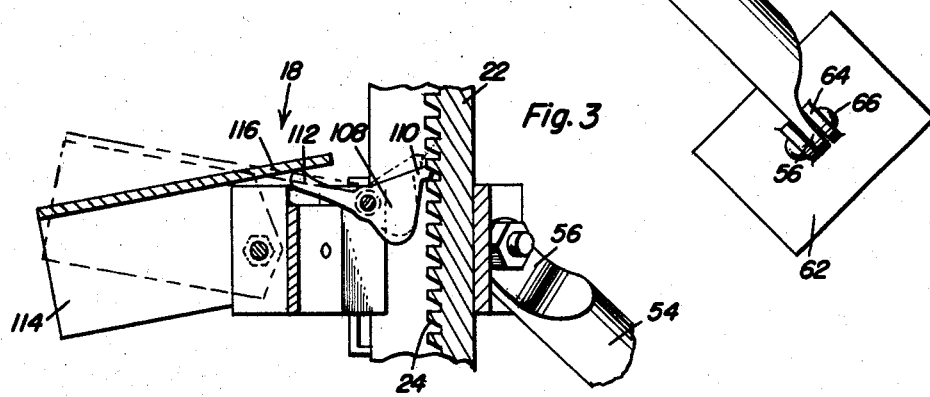
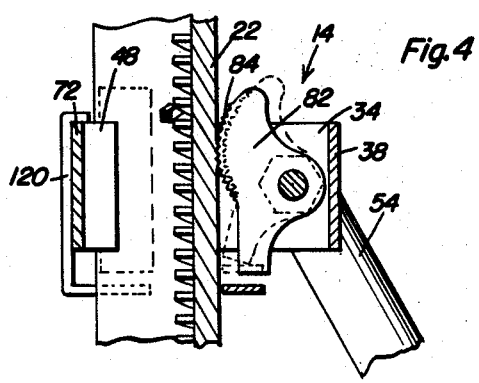
William E. Stevens
INVENTOR.

United States Patent Office 2,945,663
Patented July 19, 1960

2,945,663
BUMPER JACK SUPPORT
William E. Stevens, 2617 Taft St., Hollywood, Fla.
Filed Oct. 14, 1957, Ser. No. 689,840
5 Claims. (Cl. 248—170)

This invention relates generally to supports, and more specifically to a bumper jack support.

Usually a jack is required when a tire on an automobile is flat and it is necessary to replace the wheel with an inflated tire. With one of the tires flat, the bumper is close to the ground. It is the usual practice of a person using a jack to first put the jack in an upright position, and then start lifting the automobile by means of the jack. By the time the car has been lifted sufficiently high enough to allow the tire with the flat to clear the ground, the center of gravity of the car has been changed, and the jack is no longer upright, but is at an angle from the vertical, five degrees being a conservative estimate in the usual situation. On level ground, even if the front end of the car is being lifted, it can fly off the jack; however, it is when the rear end of the car is being lifted that the greatest amount of trouble occurs. With one wheel off of the ground, the differential gear becomes practically inoperative and full reliance is placed upon the emergency or hand brake, which is effective only on the one wheel remaining in contact with the ground. The off balance developed by the sloping jack will tend to put additional strain on the brakes, and so the car will be moved by overcoming the effectiveness of the brake. If a flat tire should be encountered on a downgrade or hill, the problem becomes even a greater one. Usually, a tire would be changed at the side of the road where road edges usually have a substantial slope, and the car may be able to slide off the jack even if the brake is efficient and the tire tread is good. Therefore, the primary object of this invention is to provide a bumper jack support which gives such support to a conventional jack that movement of this jack from a vertical position is virtually impossible.

Another object of this invention is to provide a bumper jack support which may be attached to conventional jacks and quickly and easily set up into proper position and just as efficiently removed from the jack after a flat tire has been changed.

A further object of this invention is to provide a bumper jack support wherein additional legs are provided so that the total weight of the car will be distributed onto the plurality of legs rather than on the standard jack alone.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a side elevational view of the bumper jack support comprising the present invention as it is to be used in conjunction with a conventional jack;

Figure 2 is a horizontal sectional view taken substantially along the plane defined by the reference line 2—2 of Figure 1;

Figure 3 is a vertical sectional view taken substantially along the plane defined by reference line 3—3 of Figure 2, illustrating the details of the pawl release mechanism;

Figure 4 is a vertical sectional view taken substantially along the plane defined by reference line 4—4 of Figure 2, illustrating further details of construction of the wedge used for locking the housing to the jack;

Figure 5 is a perspective view of the housing used in connection with the present invention; and Figure 6 is a perspective view of a second housing used for accommodating the handle and pawl release mechanism.

Referring now more specifically to the drawings, the numeral 10 generally designates a bumper jack to which the present invention is to be applied. The support therefor comprises generally a housing 12, a wedge unit 14 for connecting the housing to the upright support of the jack, leg sections 16 for giving added support to the unit, and pawl release mechanism 18 for releasing the housing from the upright support of the jack proper.

The bumper jack itself comprises a base 20 having an upright support 22 affixed thereto, it being noted, of course, that the upright support 22 has teeth 24 formed thereon. Raising and lowering mechanism 26 is connected to upright support 22 and has a bumper engaging portion 28 connected thereto.

The housing 12, which is the main body of the bumper jack support and which encloses upright support 22, includes right-angled plates 30 and 32, a plate 34 connected at right angles to and at the free edge of plate 30, and a plate 36 connected at right angles to and at the edge of plate 32. A plate 38 is connected at the free edge to plate 34 in parallel relation to plate 30, and a similar plate 40 is connected to the free edge of plate 36 in parallel relation to plate 32. In order to further enclose the upright support 22, the housing further includes a plate 42 connected to the free end of the plate 38 and parallel to plate 34, and plate 44 connected to the free end of plate 40 and parallel to plate 36. It is to be noted that the free ends of plates 42 and 44 have inwardly extending flanges 46 and 48, respectively. Openings 50 are formed in plates 34 and 42 in aligned relationship, and in plates 36 and 44 in aligned relationship for a purpose which will be explained below. Other openings 52 are formed in plates 42 and 44.

Leg sections 16 include tubular longitudinally extending legs 54 pivotally connected at their upper ends to housing 12. The upper and lower ends of legs 54 are formed into flat flanges 56 to adapt them for pivotal attachment. Legs 54 are pivotally connected to the housing adjacent plates 34 and 36, by means of bolts 58 which pass through openings 50 in the housings, and thence through an opening in the flanges 56. The legs are held thereon by means of nuts 60 threaded onto bolts 58. Thus, it may be seen that legs 54 are pivotally connected to the housing. The lower ends of legs 54 are connected to bases 62 which have upwardly projecting ears 64 thereon, having a rivet 66 passed through openings in ears 64 and through the correspondingly aligned opening in lower flange 56 of the legs 54.

To further enclose the upright support 22, plates 70 and 72 are connected together in right angular relationship, and connected in juxtaposition to plates 42 and 44, respectively, of the housing 12. The bolts 58 previously mentioned pass through openings in the ends of plates 70 and 72 which are aligned with openings 50. Plates 70 and 72 have extending flanges 74 and 76 with openings formed therein which are aligned, and a bolt 78 passes through the aligned openings and the flanges 74 and 76 are locked in abutting engagement by means of a nut 80 threaded onto the bolt 78. Wedges 82 are pivoted inside of housing 12, on bolt 58. As can be seen most clearly in Figure 4, the wedge has a toothed surface 84 for engagement with the external surface of the upright support 22, and this wedge is overbalanced so that the toothed portion will always tend to fall downwardly because of the force of gravity acting thereon.

At the juncture of plates 70 and 72, a generally triangular shaped mounting bracket 86 is connected. This bracket is constructed of plates 88 and 90 connected at right angles to each other, having inwardly facing flanges 92 and 94 connected at the outer free edges of plates 88 and 90, respectively. Right angled flanges 96 and 98 are connected to the free edges of 92 and 94, and are disposed in parallel relation to each other. It is to be noted that openings 100 are formed in plates 88 and 90, and that aligned openings 102 are formed in the upper portions of flanges 96 and 98, respectively. Mounting bracket 86 is connected as can be seen in Figure 2 to the plates 70 and 72 by means of rivets 104 passing through openings in plates 70 and 72 and thence into openings 100 formed in the mounting bracket. A pin 106 is passed through openings 102 in flanges 96 and 98, and a pawl 108 is pivoted thereon. This pawl 108 has a tooth 110 at one end, and a lever portion 112 at the other end. A longitudinally extending U-shaped cross-section handle 114 having an extended bight portion 116 is pivotally connected on its outer legs onto bolt 78 exteriorly of plates 74 and 76. Now, when it is desired to use this bumper jack support on a standard jack, it is merely necessary to remove the base 20 from the upright support 22 and place the housing 12 thereon, and then replace the base 20. Then, when it is necessary to use the jack, the housing 12 would be raised on the upright support 22 and the tooth 110 of pawl 108 engaged into teeth 24 of the upright support 22. The wedges 82 being overbalanced will fall toward the upright support 22 and the teeth 84 will engage the outer surface thereof. Then, the car may be jacked up in the usual manner. Now it may be seen that the upright support 22 will be locked from downward movement in housing 12 because of wedge 82. Thus, tilting of upright support 22 is prohibited because any tilting of this support 22 will tend to move the support 22 laterally which is prevented by the generally triangular support defined by the legs 54 and base 20. It is to be noted that friction elements 68 are added to the undersurface of the bases 62 to give added traction thereto. Also, lifting brackets 120 are connected to the outer surfaces of plates 70 and 72, for aiding the lifting and lowering of housing 12. When it is desired to remove the bumper jack support, it is merely necessary to move handle 114 into the dotted line position shown in Figure 3, and this will have the effect of raising pawl 108 into the dotted line position, thus forcing the housing downwardly a slight amount and releasing wedges 82. Since the housing is then released from the upright support 22, it may be moved upwardly or downwardly according to the position desired.

It may thus be seen that I have invented and herein shown and described a new and improved type of bumper jack support which prevents the creeping of an automobile jack when lifting up a vehicle in order to change a tire.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A support for a bumper jack comprising a housing adapted for sliding movement on a jack, a plurality of legs connected to said housing, lock means for selectively locking said housing to said jack, said lock means including an overbalanced, pivoted wedge mounted on the housing and having teeth on the overbalanced portion thereof, said wedge adapted for engagement with the surface of a jack positioned interiorly of said housing, said release means including a pawl mounted on the housing and engageable with the teeth of a jack for raising the jack and permitting release of said wedge.

2. A support for a bumper jack comprising a housing adapted for sliding movement on a jack, a plurality of legs connected to said housing, lock means mounted on the housing for selectively locking said housing to said jack, said lock means including an overbalanced, pivoted wedge having teeth on the overbalanced portion thereof, said wedge being adapted for engagement with the surface of a jack positioned interiorly of said housing, said release means including a pawl mounted on the housing and engageable with the teeth of a jack, handle means for actuating said pawl for lifting the jack thereby permitting release of the wedge.

3. In combination with an automobile bumper type jack having a standard with a supporting base and a movable bumper engaging jacking member mounted thereon, a support for bracing said standard to prevent tilting of the standard, said support comprising a housing slidably surrounding said standard, a pair of diverging legs pivotally attached to said housing for engagement with a supporting surface in spaced relation to each other and in spaced relation to the base of the standard for bracing the standard, movable wedge means mounted on said housing for binding engagement with the standard for preventing downward movement of the standard in the housing, said wedge means being gravity operated and movable to a position out of contact with the standard thereby enabling the standard to be freely moved in the housing, and means mounted on the housing and engageable with the standard for raising the standard in relation to the housing thereby releasing said wedge means.

4. The combination of claim 3 wherein said wedge means includes a pair of pivotal members having overbalanced inner portions provided with serrations for gripping engagement with the standard.

5. The combination of claim 3 wherein said raising means includes a plurality of teeth arranged longitudinally on said standard, a pawl pivotally mounted on said standard and engageable with said teeth, and a handle mounted on said housing for operating said pawl.

References Cited in the file of this patent

UNITED STATES PATENTS

| | | |
|---|---|---|
| 463,385 | Griffin | Nov. 17, 1891 |
| 1,080,911 | Hume | Dec. 9, 1913 |
| 1,392,144 | Gray | Sept. 27, 1921 |